3,155,528
EMULSION COATING COMPOSITION
Richard H. Cubberley, Morristown, and John P. Orsulak, Short Hills, N.J., assignors, by mesne assignments, to The Flintkote Company, a corporation of Massachusetts
No Drawing. Filed June 13, 1961, Ser. No. 116,700
4 Claims. (Cl. 106—278)

The present invention relates to an improved emulsion coating and more particularly to a stabilized aqueous dispersion of bitumen.

Dispersions of normally solid asphalt and coal tar in water are well known. They include two general types, in one of which clay is the dispersing agent and in the other of which a soap is the dispersing agent. The present composition in its most preferable form is an improvement in the colloidal clay dispersions of normally solid bitumen in water. Dispersions of this type have been described in a number of patents including United States Patents 1,479,042, 1,302,810, 1,398,201, 1,495,260, 1,506,371, 1,734,437 and others. In general, these dispersions are made by first preparing a thick aqueous suspension of colloidal clay and heating it to a temperature approximating the melting point of the bitumen to be used. The molten asphalt or tar is gradually added to the suspension of clay while the mass is subjected to rapid agitation. As the bitumen is introduced and continuously dispersed the mass thickens and water is added to maintain the desired viscosity of the dispersion. Various devices may be used for mixing the dispersion including a vortex mixer or homogenizing devices such as a Charlotte mill or a Lancaster disperser. In some cases it is desirable that the water be at a temperature above its boiling point and that the operation be carried out under pressure.

The asphalt and tar dispersions so produced have a variety of uses. These include water-proofing over concrete and the like, by spraying or brush application. The emulsion is also used for the protection of steel framing, metal walls and roofs against weather and corrosion. It may also be used for mastic flooring underlayment and patching when combined with sand, stone, gravel or the like. Another popular use is for cold applied built-up roofs where the emulsion may be used as the top coat without other protection due to its unusual weather resistance not found in hot applied asphalt.

A new and widely used process has recently been introduced for roofing involving simultaneous spraying of chopped glass fiber and clay type asphalt emulsion from a gun on to a roof. This may be used either to recover old roofs or as a new roof covering. The asphalt emulsion coats the glass fibers which are laid down in a jackstraw pattern more or less in the plane of the roof. When dry the coating is in effect a water-proof fabric. There are a number of problems, one of which is that the spraying cannot be done at very low temperatures since ice crystals form and a coating may thus be produced which is not water-proof. Another problem is the speed of drying since the faster the film dries the less chance there is that the film can be washed off in a rain storm. On the other hand, improvements in low temperature resistance and speed of drying must not be accompanied by cracking, freezing or any other undesirable features.

It is an object of the present invention to provide an improved bituminous dispersion.

It is a further object of the present invention to provide an improved bituminous dispersion which may be applied at temperatures substantially below freezing.

It is a further object of the present invention to provide an improved bituminous dispersion which may be stored at very low temperatures and which will not break when brought back up to above freezing temperatures.

It is a further object of the present invention to provide an improved bituminous dispersion having a shortened drying time.

These and other objects are attained by the present invention which relates to a composition of a bituminous dispersion containing from about 3 parts to 20 parts by weight based on a total dispersion weight of 100 parts of a compound selected from the group consisting of ethylene glycol monomethyl ether, ethylene glycol monoethyl ether and propylene glycol monomethyl ether. Preferably the composition may contain an alcohol or a mixture of alcohols selected from the group consisting of methyl alcohol, ethyl alcohol and isopropyl alcohol. The combination of the ethers and the alcohols together are preferably in the range of 5 parts to 20 parts based on 100 parts of total dispersion wherein the ethers comprise at least 3 parts by weight.

The invention may best be understood by reference of the following example of preferred embodiment of the invention but it will be understood that variations and substitutions may be made within the scope of the claims.

Example 1

|  | Parts by weight |
|---|---|
| Steam refined asphalt | 40.860 |
| Bentonite | 1.860 |
| Potassium dichromate | 0.061 |
| Chromic acid | 0.078 |
| Water | 36.641 |
| Dixie clay | 7.700 |
| Methanol | 3.200 |
| Isopropanol (95%) | 3.200 |
| Ethylene glycol monomethyl ether | 6.400 |
|  | 100.000 |

The basic dispersion was first achieved by combining molten asphalt with a slurry of bentonite, potassium dichromate, chromic acid and water passed through a Vortex mixer. Separately the Dixie clay, methanol, isopropanol and ether were agitated to form a slurry and this slurry was blended with the basic asphalt dispersion in a suitable mixing vessel such as a Robinson mixer.

The appearance of the finished dispersion was a semi dull black. The material had a heavy paint consistency. It was stable to the usual electrolytic tests with lime and sulphuric acid. It was also stable to brushing, spraying and troweling. It was found that it could be applied as a coating at temperatures as low as 15° F. On aging it was found to thicken somewhat over a period of months in storage but by the addition of water was easily brought back to its original viscosity. The dried film had the same resistance to water in the usual distilled water soaking test as the same dispersion without the alcohols or ethers. A drying film was also subjected to a Bunsen burner test and it was determined that the film had the same static qualities as films which had not contained the alcohols or ethers. This process may involve formulating with a combination of relatively volatile and relatively non-volatile anti-freeze solutions. A blend of volatile anti-freezes is used primarily for efficient initial freeze point depressing and rapid drying, fortified with the addition of ethers which remain in the emulsion longer than water, thereby maintaining freeze resistant characteristics to final dry during any drying conditions.

Several job applications were made with this composition at below freezing temperatures where the dispersion was sprayed on a roof at the rate of 8 gallons per 100 sq. ft. together with 3 lbs. of chopped fiber glass applied by means of a Sealzit gun. The coatings dried rapidly and there was no cracks. After several months the roofs appear to be in excellent condition and do not leak. It will be understood that these roof coatings were not coated with roofing granules of any type as is commonly done in the case of hot applied built-up roof coatings.

The above formulation was repeated leaving out the methanol and isopropanol and substituting an equivalent amount of ether therefor. This formulation gave excellent results although the drying rate was not as fast as with as with the alcohols. The formulation was also made up using the other selected ethers, namely, ethylene glycol monomethyl ether and propylene glycol monomethyl ether. Results were very similar to the ethylene glycol monoethyl ether. Further formulations using only one of the two alcohols were also successful with the quickest drying time obtained with the methanol plus ether. Good results were also achieved in utilizing the formula with coal tar pitch as the binder and with soap type dispersing agents in place of the bentonite.

In addition to bituminous dispersions or emulsions, we find that latex paints or other latex coatings can also be made utilizing the anti-freeze compositions. Many latex paints are now recommended for outdoor service. The usual technique in this field is to incorporate additives which prevent breaking of the latex during freezing and thawing. However, these compositions are useless at low temperatures since these additives give a product which is solid at temperatures below freezing. Consequently, they are inapplicable at low temperatures and also susceptible to cracking during drying at sub-freezing temperatures even if they were originally applied at temperatures above freezing. The following is an example of a typical paint formulation in accordance with the present invention.

*Example 2*

|  | Parts by weight |
|---|---|
| Water | 14.7 |
| Sodium salt of sulfonic acid | .5 |
| Ethylene glycol | 2.1 |
| Titanox oxide | 19.4 |
| Asbestos 6N | 5.0 |
| Gelva TS100 (polyvinyl acetate copolymer) | 32.3 |
| Hexylene glycol | 1.2 |
| Mono phenyl ether of polyethylene glycol | .8 |
| 2% soln. methocel 4000HG (methyl cellulose) | 12.8 |
| Methyl alcohol | 2.8 |
| Isopropyl alcohol | 2.8 |
| Ethylene glycol monomethyl ether | 5.6 |
|  | 100.0 |

In addition to the above composition, polyinvyl acetate, butadiene styrene, polyvinyl chloride, acrylics, vinylidene chloride and other resins customarily used in latex paints are operable in accordance with the present invention.

Many attempts were made to utilize other compounds which might conceivably reduce the freezing point but they were unsatisfactory for a number of reasons, all leading to failure of the material as a roofing composition. The use of alcohol alone, for example, was not successful.

By a selection of specific ingredients in the proportions set forth herein, a new and improved aqueous dispersion of bitumen has been formulated which can be subjected to temperatures well below 0° F. in storage and which are useful for spraying on roofs at temperatures of 15° F. or above. The compositions dry rapidly and form a stable roofing even under successive freeze-thaw cycles.

What we claim is:

1. An improved bituminous dispersion capable of being subjected to temperatures substantially below freezing without breaking and forming a functional roof coating after a short drying time comprising a dispersion of bitumen in water containing from about 5 parts to about 20 parts by weight based on 100 parts by weight of the total dispersion of a mixture of at least one alcohol selected from the group consisting of methyl alcohol, ethyl alcohol and isopropanol and at least one ether selected from the group consisting of ethylene glycol monomethyl ether, ethylene glycol monoethyl ether and propylene glycol monomethyl ether wherein the total ethers comprise at least 3 parts by weight based on 100 parts by weight of the total dispersion.

2. An improved bituminous dispersion capable of being subjected to temperatures substantially below freezing without breaking and forming a functional roof coating after a short drying time comprising a clay type dispersion of asphalt in water containing from about 5 parts to about 20 parts by weight based on 100 parts by weight of the total dispersion of a mixture of at least one alcohol selected from the group consisting of methyl alcohol, ethyl alcohol and isopropanol and at least one ether selected from the group consisting of ethylene glycol monomethyl ether, ethylene glycol monoethyl ether and propylene glycol monomethyl ether wherein the total ethers comprise at least 3 parts by weight based on 100 parts by weight of the total dispersion.

3. An improved bituminous dispersion capable of being subjected to temperatures substantially below freezing without breaking and forming a functional roof coating after a short drying time comprising a clay type dispersion of asphalt in water containing from about 5 parts to about 20 parts by weight based on 100 parts by weight of the total dispersion of a mixture om methyl alcohol and at least one ether selected from the group consisting of ethylene glycol monomethyl ether, ethylene glycol monoethyl ether and propylene glycol monomethyl ether wherein the total ethers comprise at least 3 parts by weight based on 100 parts by weight of the total dispersion.

4. An improved dispersion of a coating composition capable of being subjected to temperatures substantially below freezing without breaking and forming a functional protective coating after a short drying time comprising a dispersion of a binder in water and containing from about 5 parts to about 20 parts by weight based on 100 parts by weight of total dispersion of a mixture of at least one alcohol selected from the group consisting of methyl alcohol, ethyl alcohol, and isopropanol and at least one ether selected from the group consisting of ethylene glycol monomethyl ether, ethylene glycol monoethyl ether and propylene glycol monomethyl ether wherein the total ethers comprise at least 3 parts by weight based on 100 parts by weight of the total dispersion.

References Cited in the file of this patent

UNITED STATES PATENTS

| 1,495,260 | Reeve et al. | May 27, 1924 |
| 1,734,437 | Kirschbraun | Nov. 5, 1929 |

FOREIGN PATENTS

| 252,203 | Great Britain | Mar. 10, 1927 |
| 548,293 | Great Britain | Oct. 5, 1942 |
| 722,818 | Great Britain | Feb. 2, 1955 |

OTHER REFERENCES

"The Condensed Chemical Dictionary," 6th ed., Reinhold Publishing Corporation, New York, 1956, pp. 376 and 468.

"Dowanol" (Glycol Ether Solvents), published by The Dow Chemical Company, Michigan, 1957 (pages 20–23 relied on).